United States Patent [19]

Lontz

[11] 4,305,768

[45] * Dec. 15, 1981

[54] LAMINATING PROCESS FOR PRODUCING HIGH FIDELITY COLOR PRINTS

[75] Inventor: John F. Lontz, Wilmington, Del.

[73] Assignee: John F. Lontz Associates, Inc., Wilmington, Del.

[*] Notice: The portion of the term of this patent subsequent to Dec. 11, 1996, has been disclaimed.

[21] Appl. No.: 19,903

[22] Filed: Mar. 12, 1979

Related U.S. Application Data

[63] Continuation-in-part of Ser. No. 887,436, Apr. 10, 1978, Pat. No. 4,178,096.

[51] Int. Cl.³ .................. B32B 31/12; G03C 11/04
[52] U.S. Cl. ............................... 156/64; 8/636; 156/324; 156/334; 355/32; 355/77; 428/212; 430/7
[58] Field of Search .............. 40/615; 96/118; 156/64, 156/297, 100, 324, 334; 355/77, 32; 8/636; 430/7

[56] References Cited

U.S. PATENT DOCUMENTS 3,600,087 8/1971 Goodman et al. ............... 355/77 X
3,619,051 11/1971 Wright .............................. 355/77 X
4,087,174 5/1978 Nishikawa ....................... 355/77 X
4,178,096 12/1979 Lontz ................................. 355/32

Primary Examiner—Robert A. Dawson

[57] ABSTRACT

High fidelity color reproductions are produced whereby color correcting or compensating thin polymeric laminates are applied over photographs, prints and imaging devices and systems, that are initially deficient or excessive in some one or more color rendition, by methods comprising dyeing the thin polymeric laminates, applying an adhesive layer, and laminating onto the color deficient reproduction. The methods and their component processes begin with the production of serial ranges of instrumentally measured color intensities of dyed thin polymeric films compensating for the color deficiency or excesses, followed by applying an adhesive layer for bonding as a laminate, and by bonding the color compensating dyed polymeric film onto the initial color deficient reproduction. Critical to the method and processes described is the instrumental monitoring, by digital color indices, of the initial reproduction for the essential spectral characteristics of the color deficiency or excess for which a compensating dyed laminate with its spectral digital color indices from the serial ranges of dyed thin polymeric films is selected for the bonded lamination to produce the desired high fidelity color reproduction.

13 Claims, 10 Drawing Figures

LAMINATING PROCESS FOR PRODUCING HIGH FIDELITY COLOR PRINTS

This application is a continuation-in-part of application Ser. No. 887,436, filed May 10, 1978, now U.S. Pat. No. 4,178,096, and relates to the method and improved processes for the production of high fidelity, stable and durable color-adjusted photographs, reprocesses prints, and imaging devices and systems, wherein color correcting applied laminating overlays and interlayers of comprise thin dyed films are selected from a range of individual, selected colors of varied intensities serving to add or subtract inadequate or improper color features of the color deficient photograph, print or image.

This invention relates to the production of high fidelity color photographs, prints, and imaging devices and systems by means of applied color correcting laminates and interlayers bonded over color deficient or color exaggerated photographs, prints and imaging devices and systems.

The objective of this invention is to provide a process for producing color correcting overlay laminates and/or interlayers in the form of thin dyed polymeric films capable of being bonded onto the color deficient photographs, print, device or system, wherein the thin initially transparent films are converted by a dyeing process into a series of nominally red, yellow, green and blue transparencies in a graded, serial range of intensities.

A still further objective is to provide processing details for the above objectives in a continuous process involving fully described mechanical array of integrated, essential components whereby the passage of the initially transparent film is conveyed through the dyeing process to the desired graded, serial range of color intensities of the nominally red, yellow, green, and blue spectral colors and their intermediate spectral intervals.

A still objective is to provide a process wherein the serial graded range of the nominal red, yellow, green, and blue colors of the dyed film are augmented with additives serving to preserve the initial photograph, print, or image against actinic deterioration leading to loss or changes in the color fidelity.

A still further objective is to provide a process for the application of adhesive or bonding means involving a mechanical system of integrated essential components whereby the passage of the dyed film is given an adhesive bonding layer.

A still further objective is to provide a process for assembling a composite of finished high fidelity color photographs, reprocessed prints, or imaging devices involving the continuous passage of the color correcting overlay and/or interlaminates applied as integral component to the initial photograph, print or image.

A still further objective is to provide a process wherein the lamination and/or interlayer provides a stronger, tear-resistant and scratch resistant finished color corrected photograph, print, or image.

A still further objective is to accomplish all or part of the above objectives whereby (a) the compensating color correcting lamination and interlaminating and (b) the initial photograph, reprocessed print, or image are brought into permanent contiguity to the required high color fidelity regulated or monitored by digital color difference and measurements to monitor with conventional numerical values as described in the prior continuation-in-part application, Ser. No. 887,436, filed May 10, 1978.

BRIEF DESCRIPTION OF THE DRAWINGS

In order that the invention may be more clearly understood, reference will now be made to the accompanying drawings, in which.

Figure 1A:
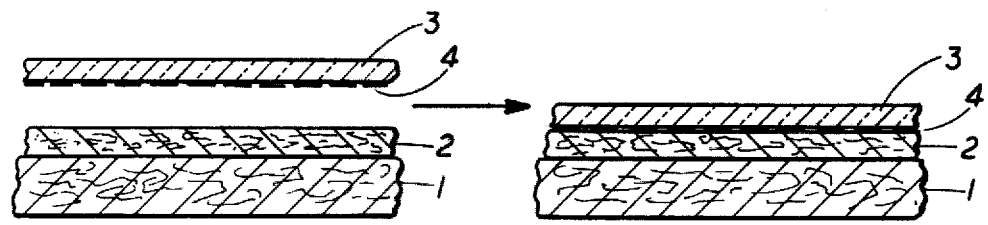
FIG. 1 is a series of cross-sectional views of the laminating overlays utilized in the present invention, wherein FIG. 1A utilizes a conventional paper base, FIG. 1B utilizes more than one overlay film and FIG. 1C utilizes a transparent base as part of the overall laminate.

Reproducing high fidelity color by photographic means and attendant processing operations is a complex and extensive involvement of art and technology. The complexity begins with variables of the initially imposed light source on the photograph object and then extends to the variables of the lens optics and their correctness, to the sensitivity and spectral limitations of the film on which the coloration of the natural object is to be registered, followed by the highly complex developing and processing variables that have to be selected and adjusted to attain the desired fidelity of the colors of the original natural object. Thus, from the object being photographed to the ultimate color print or image, the possible deviations from the desired color trueness or naturalness of the print have to be continually monitored, often by trial and error, and usually subject to the visual judgement of the photographer or the printer. Often these deviations emanate from either the exaggeration of one or more of the primary colors reflected from the subject under improper conditions of light, either spectrally or from range of intensity, or by the inadequacy of the photographic film to accept completely the optically imaged object. Thus, in addition to the proper use of the lighting on the object, the true or acceptably true development of each of the primary colors, be it a landscape scene, portrait or whatever, the technology of photographic printing involves placing each of the primary spectral colors and their myriads of combinatives chroma and hues, in a balance as near as possible to that of the original lighted object. Often, when the lighted object has been put in some unfavorable condition, the exaggerations or imbalance of the colors can be corrected often by the well-established practice of correction filters presently in use but only by subjective trial and error judgement using color filters. At best this subjective method is time-consuming, more often than not involving wasting of photographic film and color print papers.

In the art of color photography extensive use is made of supplementary color corrections by means of registered filters to adjust the imbalance or unnaturalness of the developed additive primary colors, red, green, and blue, reflected from the photographed object by the use of subtractive primary colors namely, cyan, magenta, and yellow, which are used to adjust the amount or intensity of red, green, and blue primary colors reaching the specific color sensitivities emplaced in the emulsion by the manufacturing source and its designated film standards and quality. In effect, a system of interposing the primary subtractive filters, is made available with a graded series of intensities of color and gray density, between for instance the imaged negative and the desired print. Often by visual judging of the developed print, experienced technicians can select the interposing subtractive filters in numerous combinations and also with added primary color filters to control one, selected exaggerated primary color and at the same time to intensify another, all by means of two or more filters, commonly available by the manufacturers of color photographic papers and accessories designed to assist in visual color balancing of the print so to attain the desired high fidelity terms of appropriate standards.

In the strict sense of physics, color is measured and defineable by means of reflectance spectrophotometer which measures the fraction of light reflected by an object or sample for every wave length of the visible spectrum. As a measuring and recording instrument, the reflectance spectrophotometer reads the wave length fractions for the total visible range to the human eye from the one extreme of the red, or approximately 700 nm (nanometers) wave length, to the other extreme of the blue, or approximately 400 nm. The instrumentally recorded total visible spectrum can thus be applied to any single or multiple color object, sample or substrate, to ascertain and assess differences among them. For instance, samples of a green paint from various sources and from various admixtures can be measured by reflectance spectrophotometer to form a graphic plor or profile of the reflectance of each incremental, single wave length from which the green peak, which is in about the middle of the spectrum, can be compared in among the various samples for the most prominent color as well as other subsidiary peaks thay may occur anywhere from the one extreme of the blue at 400 nm to the other extreme of the red at 700 nm. Thus, the graphic plot or profile provides an unequivocal characterization of the color spectral characteristics of a sample object with a wide usuale hitherto yet to be appreciated in the esthetics and technology of color reproduction as it provides the unequivocal defining of colored objects particularly made up as most photographs prints and images, are from many components colors in variations of chroma, hue, and value.

The color spectral reflectance in profile in graphic form however are not suitable or generally utilized for color specifications, even though spectrophotometric measurements are required in case of dispute or contested differences. Color specifications generally take into consideration the visual sensibility of the human eye, and then in terms of some numerical or digitalized color-mixtures functions, such as is established and recommended by the International Commission on Illumination (ICI) based on normal color vision. Three color mixture functions, designated x, y, and z span the entire visual range from nominally 700 nm or the red extreme to the 400 nm or the blue extreme assigned by the ICI function, are used to obtain corresponding tristimulas values from spectral measurements on colored objects or samples, designated now as tristimulus values X, Y, and Z. In actual practice these tristimulus values, expressed in numerical or digitalized form are obtained from reflectance spectra (R) by computations as product of the spectra of the light source (E) imposed on the colored object or sample, and in turn multiplied by the ICI assigned color-mixture functions, x, y, and z, to obtain the respective spectral areas which now become identified as the tristimulus X, Y, and Z digitalized or numerical values. Thus, it is simply a matter of computation of the latter from spectral wave length increments for the sample (R) reflectance and that of the imposed light source (E). The digitalized or numerical values can be obtained by simple hand calculation from the two spectra multiplied by the ICI color-mixture functions, or by electronic calculators attached to the spectrophotometer read-out signals.

The tristimulus values thus provides one means of evaluating and assessing quality and characteristics of colored objects with extensions of the values to include other sensible color components, both pure colors as well as composited colors. Quality assessment can therefore be made for specifications of coloring materials and their application to finished materials or objects and also to the control and regulation of color development as has been discovered in this invention, in which the photographic print of subjects can be compared to the actual, living color whereby the two color values can be more reliably judged for approximation, for finishing the printed rendition of the object, in contrast to the visual, often biased judgment, and for devising acceptable ranges of deviation from the living color with designated tolerances. On this basis various digital color difference meters are devised and manufactured for such use in the quality control of colored objects, such as paper, textiles, powders, paints, etc., based on specified ranges of tolerances for each of the tristimulus values or their derived forms to include not only three color ranges but even four or five. The digitalized color difference instrumentation can thus be simplified or modified for computation of these additional derived forms.

Despite the involved computation on which the ICI digitalized tristimulus values or their derived extensions are based, they actually provide a practical and meaningful interpretation. Thus, the luminous reflectance is provided by the second tristimulus value Y. One may regard X as the red, Y as the green as well as the luminous reflectance, and Z as the blue thus encompassing the entire visible color spectral range. Thus, the proportions of these three components become evident. The proportion of red regarded as "x" can be calculated from the expression $x = X/(X+Y+Z)$. Similarly, the proportion of green "y" can be calculated from the expression $y = Y/(X+Y+Z)$, and the proportion of the blue "z" similarly applies. If these tristimulus values for a given sample or object are equal then the color ranges from gray to white obviously depend upon the luminosity. If one of them is significantly greater than that of the others, it represents then the dominant color. Should the dominance from digitalized values be only slight, it is lacking in saturation with low vividness of color as in the case of pastel colors or shades.

For the purposes and the critical requirements of this invention, a modification to the ICI tristimulus system has been devised to extend upon the inadequacy of the three-color chromicity function to include a read-out for the yellow component of the spectral range, as yellow is a highly demanded color in every-day objects of clothing and apparel, foodstuffs, decorative textiles, paints, and protective items, and especially the color of living skin or flesh tones. Hence, for the success of the operation of this invention and for the apparatus and materials involved, the yellow read-out augmentation is mandatory. For the critical requirements of this invention to include yellow in the digitalized measurements of colors, the Hunterlab Digital Color Difference (DCD) Meter and the system it promulgates has been selected and adapted as the systems instrumentation for this invention with the heretofore stated objectives.

The Hunterlab DCD instrumented meter is provided with a source-photodector-filter combination designed to stimulate the International Commission for Illumination for the obtaining of the tristimulus X, Y, and Z values and the "x" and "y" chromicity coordinates described previously. The Hunterlab DCD commercial meter D25D2A is instrumented to provide the derived L, a, and b scale to give measurements of color in units of approximate uniformity throughout the color object or substrate. Thus, "L" measures brightness and various from 100 for perfect light to 0 (zero) for black, approximately as the human eye would evaluate this scale. The chromicity dimensions, "a" and "b", relate to the nominally sensible four colors suitable and required for this invention, namely, red, green, yellow and blue, instrumented to read as follows:

| "a" | measures redness<br>measures greyness<br>measures greenness | when plus (+),<br>when zero (0),<br>when minus (−), | when shown on the meter, and |
|---|---|---|---|
| "b" | measures yellowness<br>measures greyness<br>measures blueness | when plus (+),<br>when zero (0),<br>when minus (−), | when shown on the meter of | the Hunterlab DCD instrument. The relationship between these L, a, b values and the International Commission for Illumination is as follows:

$$L = 10\sqrt{Y}$$
$$a = \frac{17.5(1.02X - Y)}{\sqrt{Y}}$$
$$b = \frac{7.0(Y - 0.847Z)}{\sqrt{Y}}$$

$$Y = 0.01 L$$
$$X = \left[0.01 L + \frac{aL}{175}\right] 0.9804$$
$$Z = \left[0.01 L - \frac{bL}{70}\right] 1.181$$

An alternate scale is the Hunter R, a, b scale where the dimensions "a" and "b" describe the redness-greenness and the yellowness-blueness, respectively, for which conversions to the tristimulus values are made available. The color values as measured with the Hunter D25D2 meter are relative to the absolute value of the perfect white diffuser as measured under the same geometric conditions published in the American Society for Testing and Materials Method E306 and according to the recommendations of the International Commission on Illumination of Jan. 1, 1969. The color values of the Hunterlab meter are repeatable to a standard deviation of 0.2 scale units, when measuring a single specimen on a single instrument. The color values are reproducible to a standard deviation of 0.3 scale units between instruments of the type used in this invention. The color values are accurate to a root mean square deviation of 1.0 scale units, from an accepted reference level. The accepted references for Hunterlab meter are the Illuminant C 1931 2° observer values assigned to Master Reflectance standards, as computed directly from spectrophotometric measurements. This discussion now completes the descriptive features and the explanation of precise and accurate employment in this invention beginning with the initial spectral characteristics as a continuous line profile of the reflectance for each unit of wave length, next the conversion or translation of the spectral profile into a digitalized tristimulus and hence, a three-color measurement system and lastly to an intrumented system to include the four essential and practical colors for the effective operations and teachings of this invention.

To illustrate the suitability of augmenting the three color tristimulus system to appropriate read-out with the four principal color renditions, namely, red, green, yellow, and blue, the Hunterlab system was critically tried out with two highly competing grades of color photography films, both of the same or equivalent ASA rating, in order to ascertain how much discrimination the Hunterlab could provide on the reproducibility of a field of contrasting colors as well as subtle variations in color. In this case, a field of orchids growing in green foliage was taken as the severe test of both, the Hunterlab system and the quality of the two color photographic films. Frequently, the orchids are given an objectionable red hue rather a pale or light purple which on the color circle is a difficult color composition to attain as the red of the red-blue combination is often overwhelmed by the red in the film and in the printing paper. For purposes of appropriate identification in the ensuing discussion and in the tabulation of the digitalized data shown in Table 1, the conventional color film in the trade is designated as Film A, while its competing companion made experimentally to overcome the excessive red sensitivity is designated as Film B. A series of color prints was made from photographs of the orchid field at distances of approximately 10 meters, then 3 meters, and then 1 meter with the exacting application of all exposure and processing conditions to the final print for the read-out of the four colors by the instrument. The last-named, close 1-meter print was taken purposely to ascertain the ultimate distinction between the films as well as ascertaining the discriminating sensitivity of the DCD system. Included also in the DCD read-out was the measurements on clippings of the foliage in the form of ordinary green grass and the actual pale purple, as the human eye sees it, petals of the orchids. Table 1 summarizes the results of the L, a, b units along with the corresponding Y, X, and Z tristimulus units.

TABLE 1

| | Summary of L, a, b Readings from Prints of Films A and B<br>Subject: Field of orchids | | | | | | | |
|---|---|---|---|---|---|---|---|---|
| | | Distance | Hunter Digital Color Difference Values | | | | | |
| Film | | (meters) | L | a | b | Y | X | Z | Remarks |
| A | Orchid field | 10 | 33.1 | +1.0 | +5.5 | 10.7 | 10.8 | 9.5 | Excessive |

TABLE 1-continued

Summary of L, a, b Readings from Prints of Films A and B
Subject: Field of orchids

| Film | | Distance (meters) | Hunter Digital Color Difference Values | | | | | | Remarks |
|---|---|---|---|---|---|---|---|---|---|
| | | | L | a | b | Y | X | Z | |
| B | Orchid field | 10 | 38.4 | +3.7 | +4.0 | 14.5 | 15.1 | 14.5 | redness Acceptable |
| A | Ground foliage | 3 | 35.5 | +0.4 | +11.0 | 12.4 | 12.3 | 7.8 | Lacks greenness |
| B | Ground foliage | 3 | 30.0 | −5.5 | +10.7 | 8.8 | 7.8 | 4.8 | acceptable |
| A | Orchids | 1 | 51.3 | +7.5 | +5.1 | 26.0 | 27.6 | 26.0 | Excessive redness |
| B | Orchids | 1 | 49.7 | +1.6 | −1.2 | 24.4 | 24.5 | 29.8 | Acceptable |
| | Grass clippings | * | 58.5 | −11.1 | +3.3 | 32.2 | 29.9 | 37.4 | Natural |
| | Orchid petals | * | 62.4 | +2.0 | −1.8 | 38.9 | 38.1 | 38.5 | Natural |

*Actual clippings and petals under DCD meter.

In all three cases of photographs and prints made at the indicated distances, namely, for the orchid field with its surrounding green foliage, the closer foliage background, and ultimately on the challenging orchids, the Hunterlab provided not only significant differences with marked levels of discrimination, but also suggested means for correcting the color rendition with laminated overlays, one of the objectives of this invention, that can be selected before-hand to salvage the prints. Thus, the L, a, b system indicates which of the four, rather than just the three tristimulus corrections can be made, and is especially amenable to ascertaining how well the pale or light purple hue of the orchids in the distant and in the close focus can be reproduced even without any corrective laminating overlay of colors, once, as the Table 1 supplementing data indicates, the norms for living grass or foliage and the living petals of the orchid or any other object is ascertained and assigned the Hunterlab L, a, b units at varying degrees of luminosity.

The measured L, a, b readings with the two competing films, as summarized in Table I, confirm, as would be expected, the color renditions and color balances, such as that of the greens for the foliage with the accompanying purple for the orchids. At the 10 meter distance, the photographic prints averaged out with only the red plus "a" (+a) and the yellow plus "b" (+b) readings, and it could be only a matter of opinion as to which would be accepted as saleable item. In the present invention it is a simple matter to apply a blue overlay laminate to develop a light purple color for the obvious orchid field, and at the same time to include a red-subtracting cyan overlay as the laminate. In the case of the 3 meter distance print, focused only on the green background foliage without the orchids, the conventional Film A failed to reproduce a print with a green minus "a" (−a) value, which was brought into prominance with the Film A rendering a minus "a" (−a) value of −5.3. In this case with the Film A it is possible to impose a green coloration with a laminated overlay prescribed by this invention to give a reasonable satisfactory print. In the case of the 1-meter close-up print, the distinction between the two competing films becomes more prominent inasmuch as the color rendition of the orchid by Film A given an unrealistic dominant red with a plus "a" (+a) reading as indicated in Table 1, along with the prominent yellow plus "b" (+b), whereas Film B provides the required, nearly balanced or substantially equivalent but lessened amount of red with a plus "a" value (+a) nearly comparable to the equivalent amount of blue with the minus "b" (−b) value. The combination of the red and blue provides the color mixture for the purples as is usually described in the color circle diagram. It will be noted that the plus "a" (+a) to minus "b" (−b) ratio or proportion, with a quotion of 0.75 at the indicated value intensities, approximates that of the actual orchid petals measured in the instrument as indicated in Table 1. It is obvious therefore that no color correction is necessary for the print made from Film B. By the process of this invention, however, the print from Film A, which in large sizes represents a costly article of commerce to be discarded, can be restored to reasonable reproduction of likeness of the print from Film B by simply imposing the corrective color laminate overlay as indicated in the Examples presented in due course of this application.

The discriminating features of digitalizing the color characteristics have been found to apply equally well to the production of high fidelity color prints of portraits in which the intensity of the flesh tones of reds and yellows and especially their ratios within a narrow range, as was discovered in the application of the concept of this invention, are highly critical to attain lifelike, natural appearance. The intrusion of blues and greens into the flesh tones of portraits, for instance, either as the result of excessive high color temperatures of the light source used in making the photograph, or by the blue wash that frequently occurs during the printing operations, to cite typical technical deviations, require color corrections. These color corrections are accomplished by trial and error reprocessing using filter guides that are emplaced on the color deficient photograph to attain what would be visually acceptable as viewed subjectively, and then converted to another print or another negative from which the acceptable coloration would be attained. Often this process is repeated until the acceptable flesh tones are reproduced, but encompassing considerable loss of time and expense of the rejected off-color prints. In this invention the off-color from the first processed print is measured by means of the L, a, b units as a routine inspection for pre-determined limits of specific color, red, yellow, or the blue and greens, that would be accepted or, if not, within the prescribed tolerances to be corrected with the laminate overlays. For the purposes of this invention, and for the first time known to us, the flesh tones of actual living skin and flesh has been measured and used as standards of reflectance or comparison for the acceptable or expected balance of the flesh tones component colors.

The measured L, a, b values for human flesh tones in the area of the cheek and forearms of a selected number of males and females of white and black races have been carried out with the results summarized in Table 2. In this tabulation, the individual set of illustrative readings provide, for the first time a frame of reference for the expected reflectance (L), redness (+a value) and yellowness (+b value) along with a unique, additional monitoring ratio of the yellowness (+b value) over the redness (+a value) expressed as a quotient for ready reference in routine production control and reproducibility of processed prints. The overall observed range of the redness (+a value) with over 20 people ran from +4.0 to +10 for the actual individuals' cheeks and forearms, both interior light tone and the exterior darker tones. With a rated standard deviation of 0.2 scale units this range of redness values provides up to 30 levels of discrimination that can be detected or determined with actual, living flesh as a guide for the quality of the processed and corrected prints according to the procedures of this invention. In the case of the yellowness (+b value), the range for the same group was from 11.0 to 17.0 scale units; with the same 0.2 unit of standard deviation, this implies about the same levels of discrimination that can be obtained by using instrumental readings.

print through the use of an overlying laminate serving three specific functions. Firstly, the laminating overlay for emplacing over the print to be corrected is a transparent base film in a thinness range down to 0.25 one-thousandths of an inch serving as a filter or the color additive or color subtractive component derived from organic polymers that have a high substantivity or dye-ability to a wide range of organic dyes from the extreme reds to the extremes blues and in various gradations of color intensities of the primary and complementary spectral ranges. A variety of such thin polymeric film are commercially available. For the technical requirements of this invention, for the three specific functions involved, the second important function is adherence to, and retention of thin layers of adhesive formulations between the coloring film and the corrected print on its emulsion side. The third function is to provide carrier strength during the dyeing operation for developing the multitude of color filters, and the overlay onto the emulsion side of the print being color-corrected. Additionally, the laminating overlay film must serve as a

TABLE 2

Digital Color Difference (DCD) L, a, b Values for Living Flesh Colors
Subjects: Individual Cheeks and Forearms

| Person Code | Race (age) | Sex | Season | Measured on: | L | a | b | b/a* |
|---|---|---|---|---|---|---|---|---|
| | | | | Typical Individual Cases | | | | |
| | White (67) | Male | Winter | Forearm (O) | 52.5 | +6.2 | +13.8 | 2.26 |
| | | | | Forearm (I) | 56.5 | +7.2 | +17.1 | 2.38 |
| | | | Summer | Forearm (O) | 50.5 | +7.2 | +12.6 | 1.75 |
| | | | Winter | Cheek | 56.3 | +7.1 | +14.1 | 2.01 |
| WC | White (20) | Male | Winter | Forearm (O) | 55.2 | +7.1 | +13.2 | 1.86 |
| | | | | Forearm (I) | 56.8 | +8.0 | +14.2 | 1.78 |
| | | | Summer | Forearm (O) | 50.1 | +8.2 | +13.1 | 1.60 |
| | | | Winter | Cheek | 55.6 | +7.8 | +13.8 | 1.77 |
| SS | White (22) | Female | Winter | Forearm (O) | 59.9 | +4.2 | +15.6 | 3.71 |
| | | | | Forearm (I) | 60.1 | +4.8 | +15.8 | 3.29 |
| | | | Summer | Forearm (O) | 56.8 | +4.8 | +14.8 | 3.08 |
| | | | Winter | Cheek | 60.2 | +4.9 | +15.1 | 3.08 |
| JL | Black (36) | Male | Winter | Forearm (O) | 44.7 | +10.2 | +17.3 | 1.70 |
| CB | Black (41) | Female | Winter | Forearm (O) | 48.2 | +9.4 | +17.1 | 1.82 |
| | | Overall Range (20 subjects, both sexes and both races) | | | | | | |
| | | | | Lowest values | 44.7 | +4.2 | +12.6 | 1.60 |
| | | | | Highest | 60.1 | +10.2 | +17.1 | 3.71 |

*Ratio of Yellowness (carotenoid) over Redness (hemoglobin)
(O) Outer side of the forearm
(I) Inner side of the forearm The range of the yellowness (+b value) over the redness (+a value) serving as an additional monitoring factor can expand these levels of discrimination further, can be also used a simpler control over tolerable sub-ranges and can also be used to regulate the final print in terms of seasonal variations, as some people do acquire sun tans versus winter coloration. The yellowness over redness ratio in this case has been found to range from 1.60 to 3.71. On the low side of this range, i.e., below 1.60, this is an indication of excess redness, whereas on the high side, i.e., above 3.71, this indicates excess, unnatural yellowness or sallow appearance. The critical application of these L, a, b constants and the derived ratios will become evident in examples to be described in subsequent sections.

The primary means whereby these measured color characteristics, made on actual objects such as foliage (e.g. real green grass), flowers (real colors such as the pale or light purple of orchids), flesh or human skin colorations, and other natural objects, used as reference standards, can be corrected or adjusted on off-color print through the use of an overlying laminate serving protective, water-resistant and scratch-resistance covering to maintain durability, coupled with the inclusion of ultra-violet absorbers to prevent or decrease loss of color fidelity due to excessive actinic exposure.

The preferred overlay laminating films of this invention are derived from polymeric organic structures having an ester configuration that may be either internally within the linear chain of the polymer polyethylene terephthalate, or external to the linear polymer chain such as acetates of polyvinyl alcohol, cellulose, and the like, including their copolymer variants. These polyester structures have been bound uniquely suited by virtue of their high substantivity or affinity for a select class of dyes to be described and specified in this disclosure. These structures provide the necessary, combinative criteria of quality for the color-corrected prints that have been deficient in some color fidelity. These qualities include strength in thinness, i.e., less that of 2 one-thousandths of an inch, high substantivity to specific organic class of dyes described subsequently, strong adherencey to applied adhesives, and durability in terms of water-resistance and resistance to mechanical abrasion. The base overlay laminating films having the prescribed ester configurations in the polymer chain must have high tensile constant values notably, modulus, ultimate strength and tear resistance, all these features requiring additionally a balanced, approximated mechanical constants in the planar directions of the film, that is lengthwise versus widthwise to within 20 percent variability which is usually achieved by orienting processes in the two normal directions of the film plane. For this requirement polyethylene terephthalate films, such as used for decorative panels and for magnetic tapes, represent one ideal for the purposes of the inventions and serves as a standard with respect to the mechanical and physical characteristics can be replicated with other polyester type of films. Another required feature of the laminating overlay film, in addition to the just described mechanical strength and dye substantivity, is the selection and use of adhesives having a high degree of tack and mobility to spread uniformly when applied as a component part of the palinating overlay. These two attributes serve to impose the color correcting laminating overlay on the surface of the printed color without disturbing or shifting the emulsion layer with its component color-imparting features.

Figure 1B:
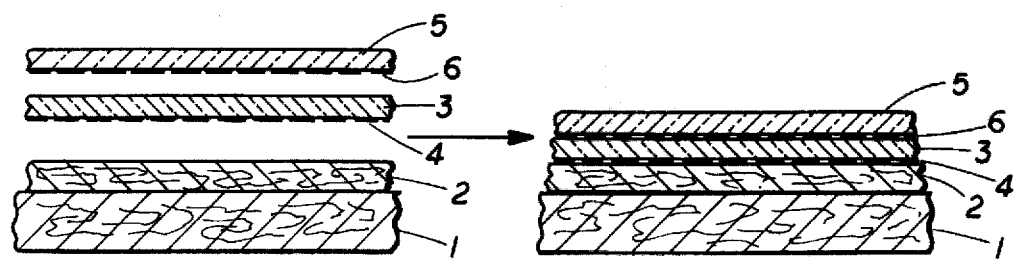
Figure 1C:
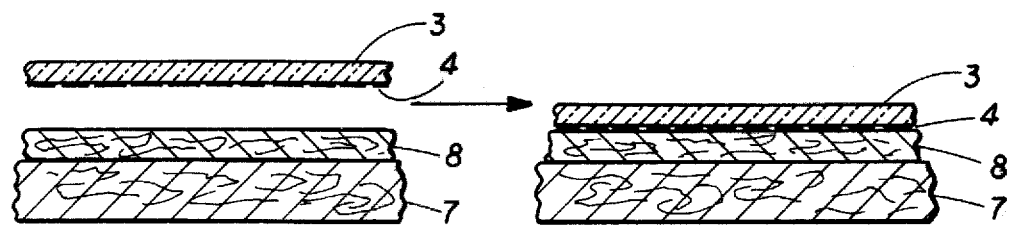

The laminating overlay, as depicted in FIG. 1a, is emplaced over the color-processed print to be corrected having the conventional paper base (1) and the color-developed emulsion (2) so that the desired color-correcting laminate film (3) with its underlayer adhesive (4) contacts the emulsion layer (2), the two components pressed in the usual fashion to form an integrated compact, corrected, acceptable finished print. In cases where two or more color corrections with the laminating overlays are indicated from the prior measurements with the L, a, b system, by color addition or intensification or by color subtractive correction, the emplacement of the two or more overlays are depicted in FIG. 1b, in which the second color correcting overlay film (5) with its layer of adhesive (6) is similarly applied and pressed onto a compact, integrated finished print as is done with the single overlay laminate. The same laminated array is applied in the case of transparencies, as indicated in FIG. 1c, in which the substrate, instead of opaque paper is a transparent film (7) with the print layer (8) usually an emulsion of the color print components from either conventional silver sensitization or xerographic replication, over which the color correcting overlay 3, 4 or 5, 6 or its combination is applied.

Figure 2:
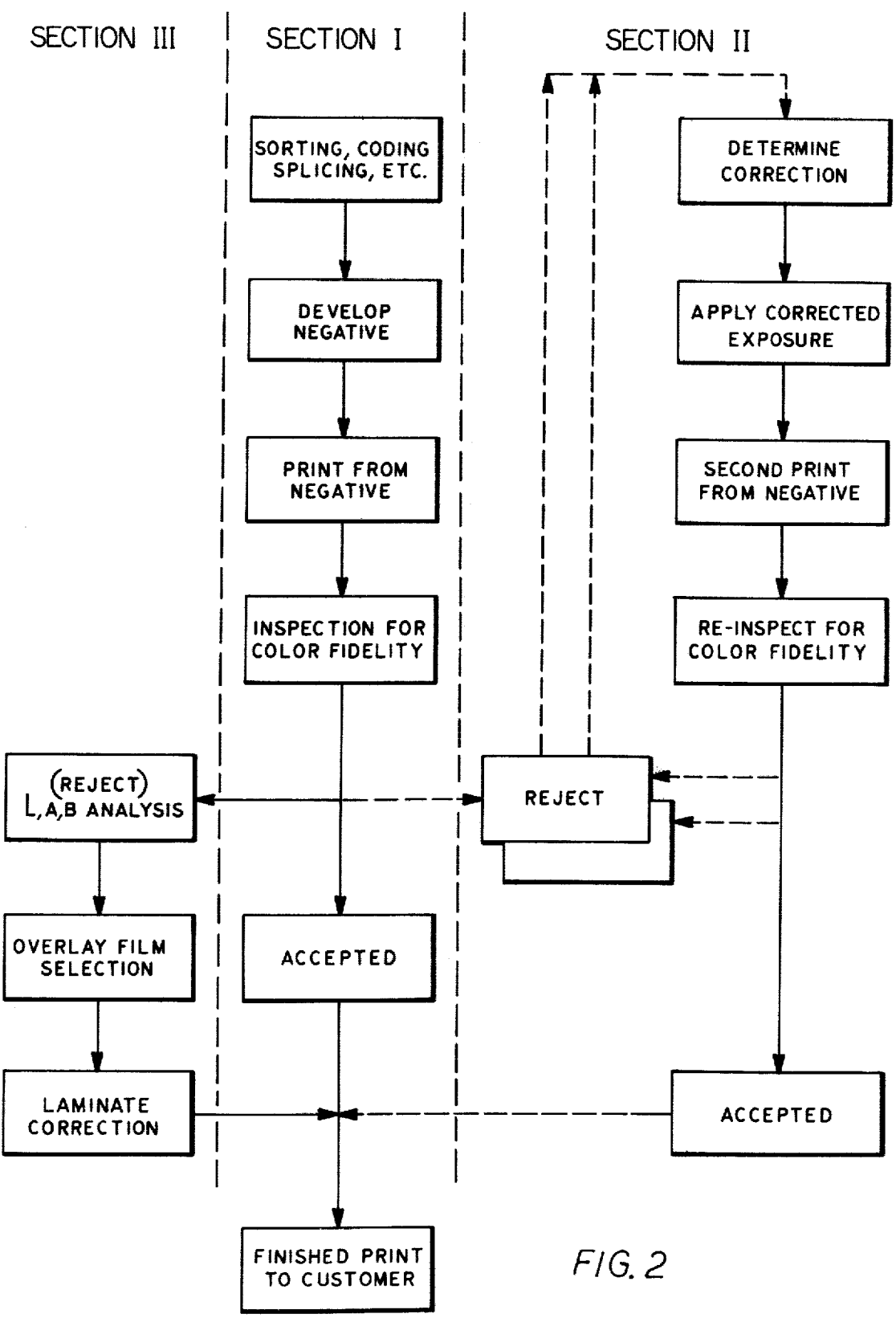
FIG. 2 is a flow diagram of color correcting systems for acceptable finished prints.

Having described the essential, technologocal features, it is next important to the understanding of this invention to indicate the manner in which the ultimate product, namely, the color-corrected print from photographs, is applied in actual production systems whereby photographic negatives are processed into marketable prints. FIG. 2 depicts by diagram the usual operating sections (I and II) in the typical color processing, mostly in automatic systems processing hundreds of prints, of exposed negative film on receipt from customers, both professional and amateur. Section I depicts the normal process wherein the completed final print comes out as an acceptable, reasonably faithful rendition of the colors involved, such as sky, landscape, fruits with realistic color, portraits and the like. Frequently, because of numerous variations in initial exposures to produce the negative, such as (a), improper lighting conditions sometimes by virtue of daytime differences, (b), depletion of certain processing chemicals or their inbalance, (d) changes in make up of water ionic strength, and many other factors, the desired print in Section I comes out with off-color printing rendering the print, as the positive, unacceptable for what the original photograph was intended or what the customer desired. The print, therefore, becomes a reject and has to be further processed often termed a remake, for the salvageable merits of the original negative. A remake, as indicated in Section II, in such a case is costly on several counts.

Firstly, there is the costly loss of chemicals, notably silver and the color developing ingredients, thereby imposing a cost factor that ultimately goes to the consumer, as well as delay for customer service. Remakes in the U.S.A. alone because of the rejection ranges from 5 to 10 percent of total photographic paper involves 47.5 to 94.9 million sq. ft. of additional photographic paper. At an average of 0.0025 troy ounces (0.0778 grams) per square foot of paper, the reject includes up to 7,380 kilograms of silver, a not insignificant economic loss of a valuable commodity.

Secondly, the repeated remake operation into a second and often third remake printing is removed from the efficient automatic process and placed into a manual operating line that requires skill of costly experts upon whom the choice of color-correction depends, usually on personal, human judgement. This supplemental manual color-correcting operation, being one of visual decision, is a matter of required good commercial service, the expenses of which effect profitability.

Thirdly, the remake operation frequently entails several hours delay for the necessary definitive evaluation of the reject as to needed color-correction by trial-and-error filters that provide color additive or subtractive re-exposures, often relegated to a back log of remake printings thereby delaying the delivery of the final, acceptable print for several days to a week or more. For these and other reasons the need for a simpler salvaging process becomes clearly evident.

For these technical and economic reasons, the application of this invention and the need for the products and processes of this invention becomes highly significant by virtue of the restorative features, depicted in Section III, of FIG. 2. This Section III involves, as explained previously, the emplacement of color-correcting laminate overlay described heretofore by a simple, non-subjective L, a, b color analysis. This involves comparing the color values of selected, key areas of the remake to reference standards in real life of the "a" and "b" values, along with the various control a/b and b/a quotients from which the necessary additive and/or subtractive overlay or overlays are chosen and then promptly applied to attain the corrected color features.

Figure 3:
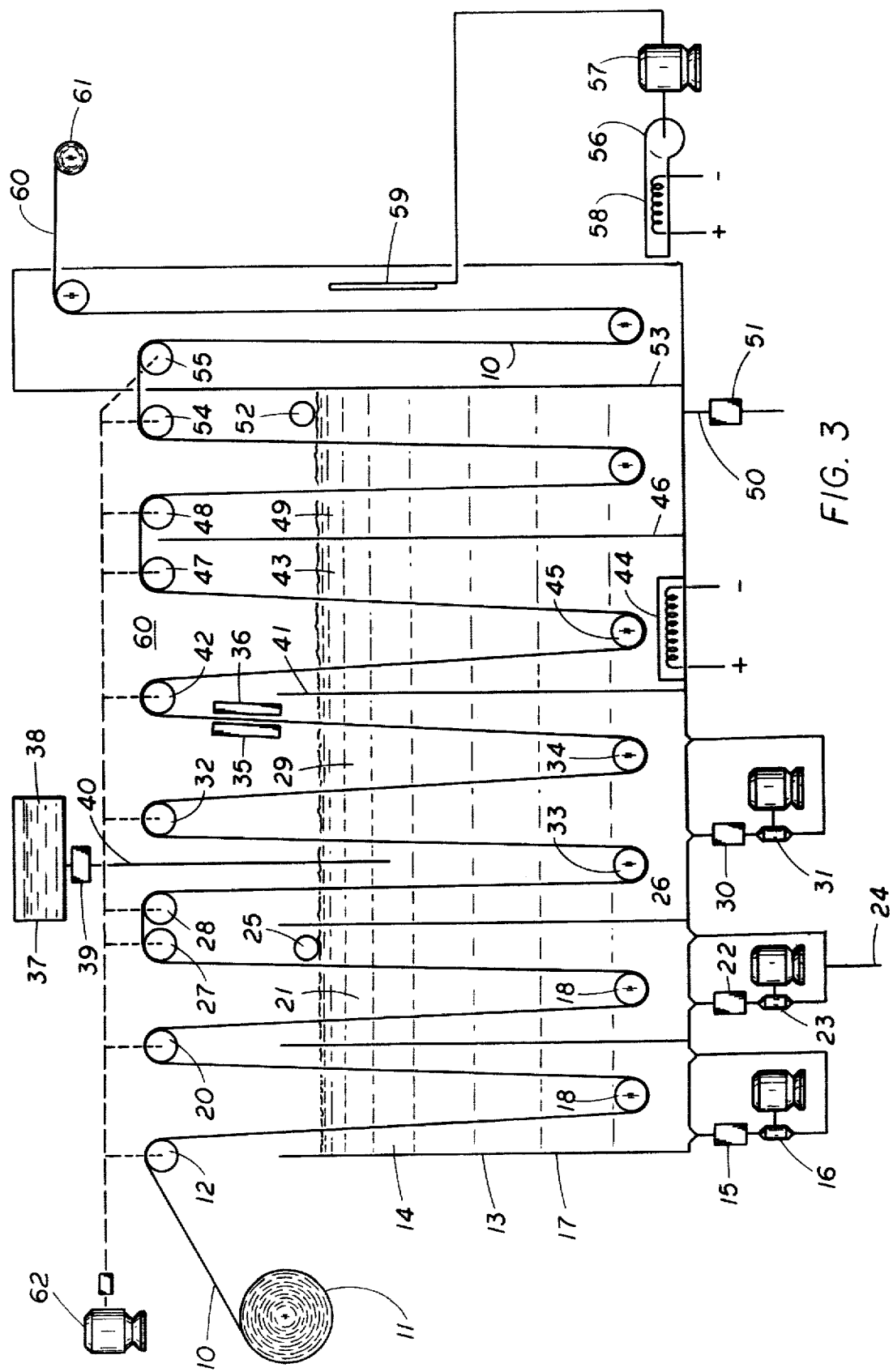
FIG. 3 is a plan view in partial cross-section of a dyeing system for the overlay film used in the present invention.
Figure 4:
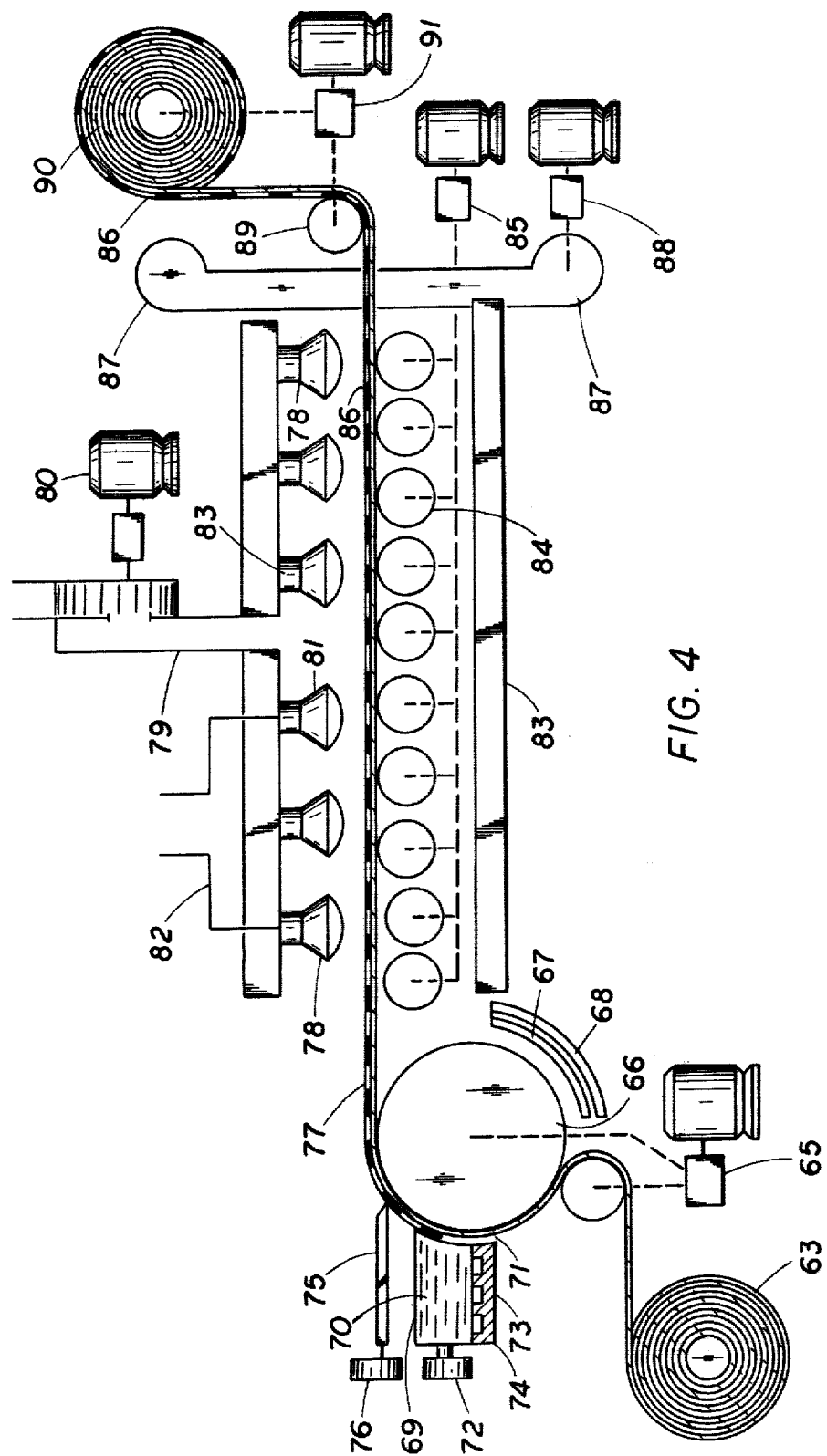
FIG. 4 is a plan view in partial cross-section of a laminating system for applying an adhesive layer to dyed films used for overlay laminating.

For the overlay laminate upon which the operation depicted in Section III of FIG. 2 depends, this invention utilizes a special process of converting the base, thin overlay film derived from organic polymers into a range of additive and subtractive color layers by a production operation depicted in FIG. 3 in which the base film is dyed to an extended series of colors and in FIG. 4 in which the dyed base are coated on one side with the required adhesive serving to effect the final interlaminar bonding.

One principal feature of this innovative operating Section III is the utilizing of thin transparent, organic, polymeric films of which there are many types in industrial, commercial applications, as mentioned previously, such as polyesters with both intralinear and extralinear functional components in the macromolecular chain. One such prominent polyester of the intralinear type is polyethylene terephthalate, available under the trademark MYLAR from E. I. du Pont de Nemours and Co., Inc., in commercial thickness grades ranging from 0.00025 inch, commonly referred to as one-quarter mil, to 0.002 inch or more, commonly referred to as 2 mil film. In a typical procedure for developing colored, dyed overlay films, MYLAR Type 2 polyethylene terephthalate, one-thousandth of an inch thick (1 mil) is prepared for dyeing in a one (1) percent MERPENTINE detergent aqueous solution at 60° C. for a period of 1 to 3 minutes. The film is then rinsed with clear tap water at a temperature of 60° C. A dye bath is prepared using a formulation containing 0.25% of the water disperse selected dye, 7.5% of a surface active agent, 2.5% denatured alcohol and 90% water. The MYLAR film is immersed in the dye bath for periods from 3 seconds to 1,000 seconds depending upon intensity of color desired. The film is then immediately removed from the dye bath, rinsed in clear tap water at (60° C.) 140° F. and dried by appropriate means. In this formulation, the water dispersed dyes are available from E. I. du Pont Co. under the registered trade name of LATYL disperse dyes formulated with 2 parts ALKANOL XC (du Pont Co.), 2½ parts pine oil available from various commercial sources, and 3½ parts water. Following this dyeing operation, illustrated in FIG. 3, the dye film is next coated on one surface with a thermoplastic adhesive, depicted in FIG. 4, and subsequently applied as a color correcting laminating overlay over the deficient color print by the method depicted in FIG. 4.

In FIG. 3, the polymer film such as MYLAR plastic film 10 in either a narrow or wide web width, is carried by a pay-out roller 11, the tension on said roller being adjusted by appropriate means. The plastic film 10 is led by means of friction driven roller 12 into tank 13 which contains a 1% aqueous detergent solution 14, maintained at a temperature of (60°+2°-3° C.) by means of a thermostatically controlled heat exchanger 15 and motor pump assembly 16 attached thereto. In order to conserve heat losses the process assembly is insulated with appropriate thermal insulation 17. The immersion time in the aqueous detergent solution may be adjusted by providing an additional bottom idler roller 18 as well as additional frictional drive roller 12 so that the polymeric film may be festooned within tank 19 thereby increasing the number of lineal feet of film solution. The cleaned film is then led into tank 19 by means of frictional drive roller 20 and is rinsed clean of the aqueous detergent solution by means of immersion in tap water 21 which is maintained at a temperature of (60° C.±2°-3° C.) by means of a thermostatically controlled heat exchanger 22 and a motor pump assembly 23 attached thereto. A fresh water inlet 24 is provided to tank 19 along with an overflow port 25. The clean rinsed plastic film is let into tank 26 by means of frictional drive rollers 27 and 28 and then immersed in a water disperse dye solution 29. The temperature of the solution is maintained at (82°-93.5° C.) by means of thermostatically controlled heat exchanger 30 and a motor pump assembly 31 attached thereto.

The intensity of color imparted to the plastic film is a function of dye concentration in solution 29 which is maintained between 0.25% and 0.50% as well as by the total immersion time within the dye solution. The immersion time is controlled by providing additional frictional drive roller 32 at the top of the tank and additional idler rollers 33 and 34 in the bottom of the tank. Color density or intensity in the plastic film is monitored by a photoelectric cell 35 placed on one side of the film at an exit point from the dye bath 29, using a low intensity collated light source 36 passing a beam through the film 60 and activating the photoelectric cell. The concentration of dye in solution 29 is maintained by means of a monitored feed system to tank 26. A stock feed tank containing a disperse dye concentrate solution is fed into tank 26 through an electrically controlled valve 39 which in turn is activated by photocell 35. The make-up dye concentrate is led into tank 26 by pipe 40.

The dyed polymeric film is next led into tank 41 by means of frictional drive roller 42 into a preliminary tap water rinse 43 which is maintained at a temperature of (60° C.±2° C.) by means of an internal jacketted heater 44 activated by an external power source and controlled by means of an immersion thermostat 45. The polymeric film is then led into tank 46 by means of frictional drive rollers 47 and 48 and immersed in clean filtered water 49. A source for filtered tap water is provided by means of pipe 50 into tank 46 and a control valve 51 is provided to monitor the flow of water. An overflow port 52 is provided in tank 46.

The clean dyed polymeric film is led into dyeing chamber 53 by means of frictional drive rollers 54 and 55. Air is introduced by means of blower 56 powered by motor 57. The air is heated to 49°-60° C. by means of electric coils 58 in blower 56. The air temperature is maintained within the drying chamber 53 by a thermostat 59 which controls motor 57 and heater elements 58.

The dyed film 60 is taken up on spool 61, powered by a positive variable speed arrangement. Frictional drive rollers 12, 20,,27, 28, 32, 42, 47, 48, 54 and 55 are synchronously driven by means of a motor and drive system 62.

EXAMPLE I

This example describes the procedures for producing a range of color correcting overlay laminates and interlaminates utilizing the mechanical system depicted in FIG. 3. A roll of thin film such as MYLAR polyethylene terephthalate 9 of appropriate width is carried by a pay-out roller 10, the tension on said roller being adjusted at the mandrel 11. The thin polymeric film 9 is further led by means of friction driven roller 12 into tank 13 which contains a 1 percent aqueous detergent solution 14 serving as a surface active agent, maintained at a temperature of 60°±2°-3° C. by means of a thermostatically controlled heat exchanger 15 and a motor pump assembly 16 attached thereto. In order to conserve heat losses the process assembly is insulated with appropriate thermal insulation 17. The immersion time in the aqueous detergent solution is adjusted by providing an additional bottom idler roller 18 as well as additional frictional drive roller 12 so that the polymeric film may be festooned within tank 19 thereby increasing the number of lineal feet of film in the solution. The cleaned film is then led into tank 19 by means of frictional driver roller 20 and rinsed clean of the aqueous detergent solution by means of immersion in tap water 21 which is maintained at a temperature of 60° C.±2°-3° C. by means of thermostatically controlled heat exchanger 22 and a motor pump assembly 23 attached thereto. A fresh water inlet 24 is provided to tank 19 along with an overflow port 25. The clean rinsed plastic film is led into tank 26 by means of frictional drive rollers 27 and 28 and then immersed in the water dispersed dye solution 29. The temperature of the solution is maintained at 82°-93.5° C. by means of thermostatically controlled heat exchanger 30 and a motor pump assembly 31 attached thereto.

The intensity of color imparted to the polymeric film is a function of (a) dye concentration in solution 29 which is maintained between 0.25 percent and 0.50 percent and (b) the total immersion time within the dye solution. The immersion time is controlled by providing additional frictional drive roller 32 at the top of the tank and additional idler rollers 33 and 34 in the bottom of the tank. Color density or intensity in the plastic film is monitored by a photoelectric cell 35 placed on one side of the film at an exit point from the dye bath 29, using a low intensity collated light source 36 passing a beam through the film 60 and activating the photoelectric cell. The concentration of dye in solution 29 is maintained by means of a monitored feed system to tank 26. A stock feed tank containing a disperse dye concentrate solution is fed into tank 26 through an electrically controlled valve 39 which in turn is activated by photocell 35. The make-up dye concentrate is led into tank 26 by pipe 40.

The dyed polymeric film is next led into tank 41 by means of frictional drive roller 42 into a preliminary tap water rinse 43 which is maintained at a temperature of 60° C. ±2° C. by means of an internal jacketted heater 44 activated by an external power source and controlled by means of an immersion thermostat 45. The polymeric film is then led into tank 46 by means of frictional drive rollers 47 and 48 and immersed in clean filtered water 49. A source for filtered tap water is provided by means of pipe 50 into tank 46 and a control valve 51 is provided to monitor the flow of water. An overflow port 52 is provided in tank 46.

The clean dyed polymeric film is led into drying chamber 53 by means of frictional drive rollers 54 and 55. Air is introduced by means of blower 56 powered by motor 57. The air is heated to 49°-60° C. by means of electric coils 58 in blower 56. The air temperature is maintained within the drying chamber 53 by a thermostat 59 which controls motor 57 and heater elements 58.

The dyed film 60 is taken up on spool 61, powered by a positive variable speed arrangement. Frictional drive rollers 12, 20, 27, 28, 32, 42, 47, 48, 54 and 55 are synchronously driven by means of a motor and drive system 62.

EXAMPLE II

This Example provides the details of the digital color difference measurements obtained in the application of the process described in FIG. 3 for the purpose of preparing a range of color intensities using a series of typical anthraquinone and other polynuclear aromatic dyes such as are listed in the text, Colour Index, published by the American Association of Chemists and Colorists. From this listing, specific chemical types of dye colors substantive to organic substrates having either acidic, basic, ester, amide, and other binding affinity can be selected to gain the desired color chroma, hue, or value into the polymeric film base, such as the MYLAR polyester film referred to in FIG. 3. In this Example, a series of spectral colors in the nominal primary and complementary range is prepared using the commercial process designated as the LATYL process mentioned previously, applying a fixed series of time exposure in dye tanks ranging from 10 to 3000 seconds exposure in the dyeing solutions. The resulting dye color intensities from this range of dye bath exposure times are measured in the Digital Color Difference spectrometer for the L, a, b readings on the finished dye operation, which readings are used to make a standard range of intensities for use as overlay laminates to be applied for the color corrections or adjustments for the rejects or remakes described in FIG. 2, Section II, for processing according to Section III in FIG. 2. The L, a, b readings for a typical series of spectral LATYL dyeing, singly and in combination are listed in Tables 3a and 3b, obtained by the process depicted in FIG. 3. The measurements are made against a standard white tile background having an "L" value of 94.4 percent, and "a" value of −1.2 and a "b" value of +2.0, over which the series of dyed polyester films are emplaced and measured for the corresponding L, a, b values.

TABLE 3a

Digital Color Difference (DCD) L, a, b Values
Dyes: Additive Primary (LATYL Series)
Overlay film: Polyethylene terephthalate (MYLAR)
0.25 mil thick by 12 inch wide

| Color Designation (Nominal) | LATYL Grade | Dye time (sec.) | DCD Values L | a | b | Principal (Dominant) Color Ratio |
|---|---|---|---|---|---|---|
| Red STD | Basic Red FV | 10 | 84.4 | +4.3 | +4.2 | Red/Yellow 1.02 |
| | | 33 | 82.5 | +7.3 | +4.6 | 1.59 |
| | | 67 | 79.7 | +11.4 | +5.6 | 2.04 |
| | | 100 | 79.7 | +11.5 | +5.8 | 1.98 |
| Red ALT | Bordeaux B (16) | 10 | 83.1 | +3.3 | +4.2 | Red/Yellow 0.79 |
| | Cerise NSN (29) | 33 | 80.6 | +5.7 | +5.4 | 1.06 |
| | Yellow 3G (19) | 67 | 73.5 | +13.1 | +10.0 | 1.31 |
| | | 100 | 59.6 | +29.9 | +17.2 | 1.74 |
| Green | Yellow GFSW (45) | 10 | 87.3 | −4.3 | +5.6 | Green/Yellow 0.77 |
| | Brilliant Blue (25) | 33 | 86.9 | −5.7 | +7.1 | 0.80 |
| | * | 67 | 86.5 | −6.7 | +7.7 | 0.87 |
| | | 100 | 85.8 | −7.7 | +8.6 | 0.89 |
| | | 300 | 85.0 | −15.8 | +11.4 | 0.72 |
| Blue STD | Violet BN | 10 | 81.0 | 0.0 | −4.7 | Blue/Green — |
| | | 33 | 75.0 | +1.3 | −11.6 | 8.92 |
| | | 67 | 69.8 | +2.7 | −17.9 | 6.63 |
| | | 100 | 67.8 | +3.7 | −21.6 | 5.83 |
| Blue ALT | Blue 4R | 10 | 83.4 | −1.9 | −1.3 | Blue/Green 0.68 |

TABLE 3a-continued

Digital Color Difference (DCD) L, a, b Values
Dyes: Additive Primary (LATYL Series)
Overlay film: Polyethylene terephthalate (MYLAR)
- 0.25 mil thick by 12 inch wide.

| Color Designation (Nominal) | LATYL Grade | Dye time (sec.) | DCD Values L | a | b | Principal (Dominant) Color Ratio |
|---|---|---|---|---|---|---|
| | | 33 | 80.3 | −2.1 | −5.0 | 2.38 |
| | | 67 | 79.0 | −2.1 | −6.3 | 3.00 |
| | | 100 | 78.1 | −2.1 | −7.1 | 3.38 |

*Mixtures in proportions indicated in parentheses

TABLE 3b

Digital Color Difference (DCD) L, a, b Values
Dyes: Subtractive Primary (LATYL series)
Overlay film: Polyethylene terephthalate (MYLAR)
- 0.25 mil thick by 12 inch wide

| Color Designation (Nominal) | LATYL grade | Dye Time (sec.) | DCD Values L | a | b | Principal (Dominant) Color Ratios |
|---|---|---|---|---|---|---|
| Cyan | Brilliant Blue BGA | 10 | 86.9 | −3.2 | +1.1 | Green/Yellow 2.9 |
| | | 33 | 86.1 | −3.9 | +0.3 | Green/Yellow 10.3 |
| | | 67 | 85.5 | −4.6 | −0.2 | Green/Blue 23.0 |
| | | 100 | 85.6 | −4.4 | −0.2 | Green/Blue 23.0 |
| | | 300 | | | | |
| Magenta | Bordeaux B | 10 | 85.2 | +1.1 | −16.2 | Blue/Red 14.7 |
| | | 33 | 83.2 | +3.1 | −10.4 | Blue/Red 3.4 |
| | | 67 | 74.9 | +10.9 | −2.1 | Red/Blue 5.2 |
| | | 100 | 69.9 | +16.4 | −0.0 | Red/Blue 16 |
| | | 300 | | | | |
| Yellow | Yellow 3G | 10 | 88.2 | −7.3 | +14.2 | Yellow/Green 1.95 |
| | | 33 | 88.0 | −8.8 | +20.5 | Yellow/Green 2.33 |
| | | 67 | 87.9 | −9.7 | +22.7 | Yellow/Green 2.34 |
| | | 100 | 87.9 | −10.1 | +23.6 | Yellow/Green 2.34 |
| | | 300 | 86.8 | −11.3 | +26.5 | Yellow/Green 2.35 |

The data in Tables 3a and 3b provide a working example of an extensive series of LATYL dyes of various color designations for the principal additive and subtractive primary colors, respectively, from which various levels of monochromicity can be attained for the corrective overlays, such monochromicity being evident by the ratios of the "a" and "b" values indicated for the four measured spectral colors utilized in this invention, namely, red, yellow, green, and blue and their components. In the case of the overlays with the primary additive colors, shown in Table 3a, of particular merit is the novel means of using mixtures of organic dyes in such a manner as to enhance, for instance, a given ratio of any two additive colors. For instance, the nominal blue dye color overlay can be produced for high degree of blue chromicity by replacing LATYL Blue 4R with LATYL violet whose blue/green ratios are appreciably higher. Other mixtures of primary additive dyes with even primary subtractive dyes can be devised to gain even substantially higher ratios with other variations of the four principal colors, calculatable from selected combinations of dyed film substrates. In the case of the subtractive primary colors, summarized in Table 3b, the dye time in the bath has an important effect not only on the intensity of the monochromicity values but also on the dominant monochromicity ratio which has been found to change with increasing dye time. For instance, the cyan values with LATYL Brillant Blue BGA changes from a dominant green (−a) over yellow (+b) ratio to a dominant green (−a) over the blue (−b) ratio between the 33 and 67 immersion time, suggesting a unique initial molecular binding of the LATYL dye to the polyester overlay film. In the case of the magenta series using LATYL Bordeaux B, a pronounced inversion or shift occurs similarly between 33 and 67 seconds from the initial high blue over red monochromicity to a dominant red over blue. Thus, this Example illustrates the surprising and unexpected feature of mode-rating an absorptive chromophoric dye producing varying levels of dominance and inversion of both the additive and subtractive primary colors that can be incorporated into the corrective overlay films.

EXAMPLE III

This example describes the procedures for applying a bonding layer to the dyed overlay polymeric dyed fils produced by the technical, processing details and color monitoring described in preceding Example I and II by means of the mechanical array and systems depicted in FIG. 4, which is the apparatus for applying a thermoplast adhesive or bonding layer to one side of the dyed polyethylene terephthalate film. The dyed film 60 is carried from roll 63 which is appropriately tension controlled, next, over roll 64 driven by means of motor and drive assembly 65 and over supporting roller 66 maintained at a surface temperature range of 50°–110° C., depending upon chemical type and grade of adhesive used, controlled pyrometrically be electric resistant heater 67 protected in turn by insulation shield 68. An adjustable reservoir 69 containing a bath of adhesive 70 in melt or solution form is contoured to fit against the surface of drum 66. A constraining shoe 71 machined from polytetrafluorethylene stock is attached to the contact surface of reservoir 69 and further contoured to match-fit the peripheral section of drum 66. The low coefficient of friction of polytetrafluorethylene allows positive contact of reservoir 69 to be made with the plastic film 60 against the supporting roller without distortion of the film. A means for providing frictional clearance between the reservoir 69 and the supported film 60 is maintained by the micrometer adjustment device 72, whereby a layer down to sub-micron thickness of the adhesive can be applied. The adhesive bath 70 is maintained in a melt state or warmed to mobile viscosity by means of pyrometrically controlled electrical resistance heater 73 protected by a thermal insulating blanket 74.

The adhesive in reservoir 69 typically consists of a blend of polyisobutylene, available under the trade name of VISTANEX from Exxon Chemical Co., Elastomers Dept. and microwaxes with melting points in the range of 76° C. to 85° C. Adjustments in proportional amounts of VISTANEX and microwaxes to produce adhesives with specific melt temperatures for effective draw in the drive system are shown in FIG. 4. An adhesive bath with melting temperatures from 93° C. to 149° C. is desirable. A small amount of a nonpolar hydrocarbon solvent in the order of 2-10 percent may be added to the adhesive bath in order to adjust the viscosity. A preferred viscosity range may be from 14 to 48 centipoises as measured with a Brookfield type viscosimeter. To further enhance the effectiveness of the plastic film overlay in protecting color photographs from fading, various ultraviolet stabilizers are added to the adhesive bath.

As the polymeric dyed film passes over that zone of the supporting roller 66 against which the reservoir 69 is impressed, it picks up a coating of adhesive only on one surface. As the film travels further along the periphery of the supporting roller 66, the adhesive layer thickness is adjusted by means of a knife blade 75. The gap between the edge of the knife blade 75 and the film 60 which, in turn, controls the thickness of the adhesive layer deposited upon the film surface, is adjusted by means of a micrometer-screw assembly 76. The fluid adhesive coated film 77 then proceeds through drying zone 78 wherein any volatile materials, such as solvents, are removed from the adhesive and then exit through exhaust system 79 driven by drive motor 80. The drying apparatus consists of a series of infra-red lamps 81 powered by an external electrical source 82. Uniform heat retention is enhanced by means of insulating walls 83. The adhesive coated dyed polymeric film is supported throughout the drying zone by rollers 84 which are driven in turn by motor-gear assembly 85. The adhesive coated, dyed polymeric film free of any volatile substances 86 is cooled by blowers 87 which are driven by motor assembly 88. The cooled film is led around rollers 89 and is taken up on spools 90 which are driven by motor-gear assembly 91.

Figure 5:
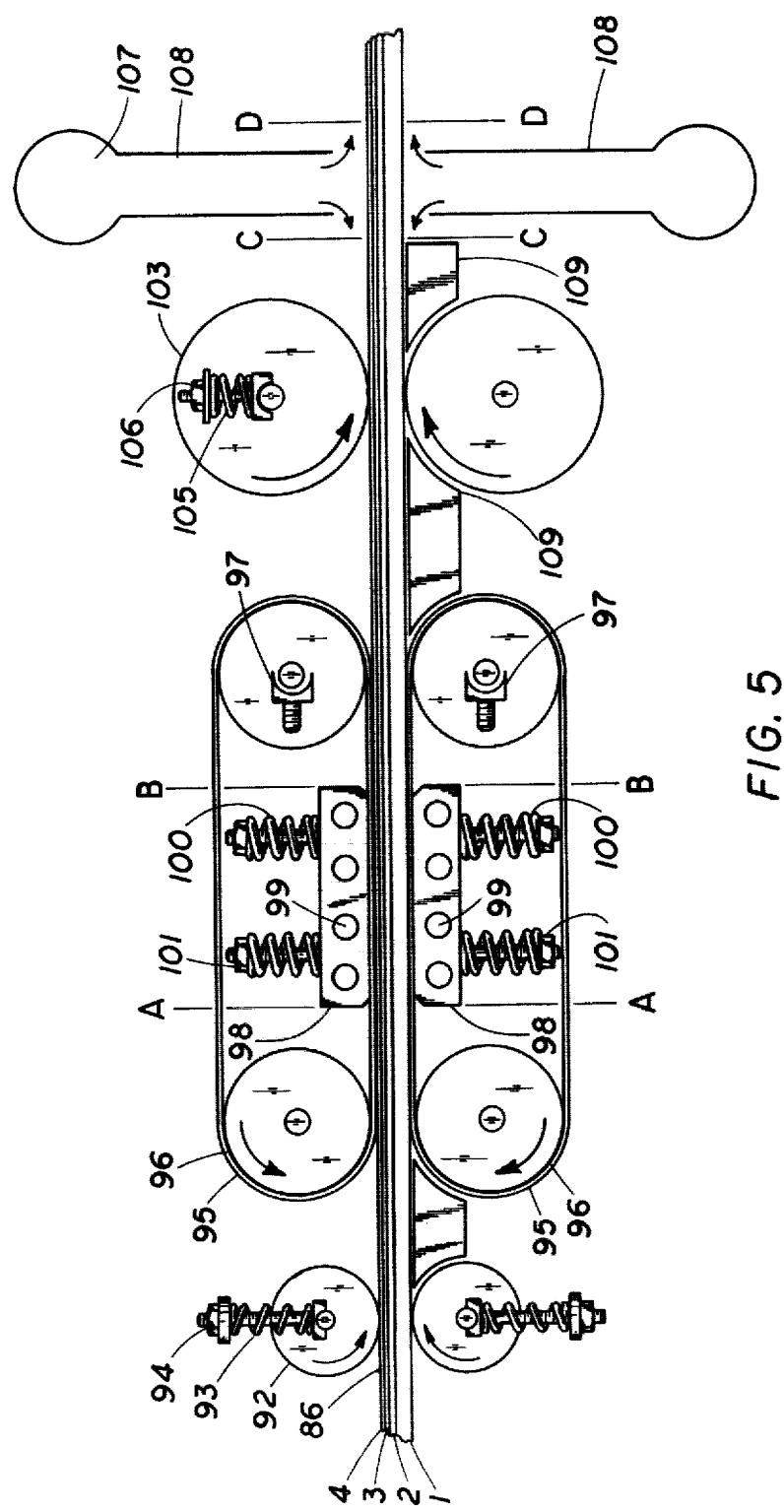
FIG. 5 is a cross-sectional view of a laminating system for applying a single overlay layer to the color deficient color print.

With the completion of the procedure described in FIG. 3, stocks of the adhesive coated, dyed polymeric films are made available for each of the three additive primary and three subtractive primary colors with a range of at least three intensitives for each of the colors as measured and appropriately specified from the L, a, b values such as described in Example I with the pertinent, exemplary values in Tables 3a and 3b. The stock of six additive and subtractive colors with the desired range of intensities are readily established from the at hand experience with remakes so that substantially all of the color deficient remakes can be processed with appropriate laminating color overlay or overlays. This overlay lamination is depicted in FIG. 5 wherein one single additive or subtractive correction is sufficient and in FIG. 6 wherein combinations of two of the additive and subtractive corrections may be needed. The extent to which the single or multiple corrections need to be applied is efficiently carried by correlation measured L, a, b values on the remake print computerized, reference color system that would call for the laminate correction to within few percent of the expected high fidelity of finished print such as initially depicted in FIGS. 1a, 1b, and 1c.

EXAMPLE IV

The laminating assemblage of FIG. 1a is accomplished by means of a laminating apparatus and arrangement shown in FIG. 5. The composite of dyed polymeric film with an adhesive overlay 86 on top of the remake photograph layers (1,2) of FIG. 1a to be color corrected is led in between rotating rubber rollers 92 having a Durometer hardness between 40 and 70. Rollers 92 are held in compression against the dyed polymeric film-adhesive over the remake composite by means of compression springs 93 which are adjustable by means of the adjusting nuts 94. In addition to guiding and moving the composite of the correcting film overlay and the off-color remake photograph through the laminating apparatus, the rubber compression rollers 92 serve to eliminate any air entrapped between the film overlay and the remake photograph prior to the assembly of 86 and layers (1,2) of FIG. 1a moving into the heat laminating zone. The adhesive layer on the polymeric film is heat activated beginning in the contact region of rolls 96 and caused to be bonded to the imaged surface of FIG. 1a of the remake photograph, thereby permanently affixing the color corrective polymeric film overlay to surface 2 of the off-color photograph. The bonding and, hence, laminating process resulting from the heat activation of adhesive layer 4 is thereby accomplished by the continued motion of the film and photograph assembly (85½) from the nip of the rollers 92 through the moving endless belts 95 maintained in position by the motor-gear drive pulleys 96. The belt tension is controlled by means of the turnbuckle 97. The endless belts 95 is a form of light gauge thickness, flexible for turn around stainless steel such as Type 302 or Type 304, full temper with a thickness of 0.002 to 0.010 inch and of a sufficient width to accommodate the full width of the corrective polymeric film overlay-photographic print composite assembly. The endless belt may be made from other suitable materials such as glass fabrics impregnated with fused or adherent polytetrafluoroethylene available commercially under the trade name ARMALON, a product of E. I. du Pont de Nemours & Co., Inc. in thickness ranging from 0.005 to 0.0.5 inch.

As the assembly of the dyed polymeric film with the photographic remake moves through the apparatus of FIG. 5 under the constraints and transverse compression of the moving endless belts 95, the belts are additionally being heated between points A and B by means of heating blocks 98 in turn receiving the adjustable heat from the pyrometrically controlled cylindrical or tubular electric resistance heaters imbedded in metallic heating blocks 98. The transverse pressure is applied to the heating blocks 98 and to the endless belts 95 between points A and B further transmitted to the polymeric film overlay to the remake print assembly by means of compression springs 100 which are adjusted by the threaded nuts 101. Adjustments are made to the apparatus relative to the speed of traverse of the overlay to photograph assembly and to the thermal level transmitted to the adhesive layer 4 in the assembly as well as to the assembly between points A and B. The entire operation is controlled in such a manner as to expose the polymeric film lamination to the remake photograph to a temperature range of 80° to 150° C. for a period of 1 to 10 minutes under a transverse overlay laminating pressure of 5 to 25 pounds per square inch. Under these specific and critical conditions to avoid insufficient bonding on the one hand and thermal degradation of the desired color correction as well as film damage, the adhesive layer 4 melts properly and bonds to the surface of the remake photograph 2 for permanence.

The bonded polymeric film overlay to photograph print assembly 102 continues to move through the apparatus between the motor driven rollers 103 and 104. The compression of rollers 103 against the corrected photographic assembly 102 is adjusted by means of the compression spring 105 actuated by the assembly nut 106. The surface of the profile roller 102 may be smooth thereby imparting a high gloss finish to the polymeric film overlay laminated to remake photograph, or it may be embossed to impart a textured finish, such as a matte, silk weave, etc., as is usually accepted in the industry. The entire bonded assembly continues to move through the cooling region C and D where the corrected photographic remake is cooled by means of blowers 107 of ambient or cooled air through ducts 108. In moving through the train of the apparatus, the single polymeric film adhesive layer 86, the color photograph layers 2-1 as well as the bonded assembly 102, are intermittently supported by means of the supporting base 109.

Figure 6:
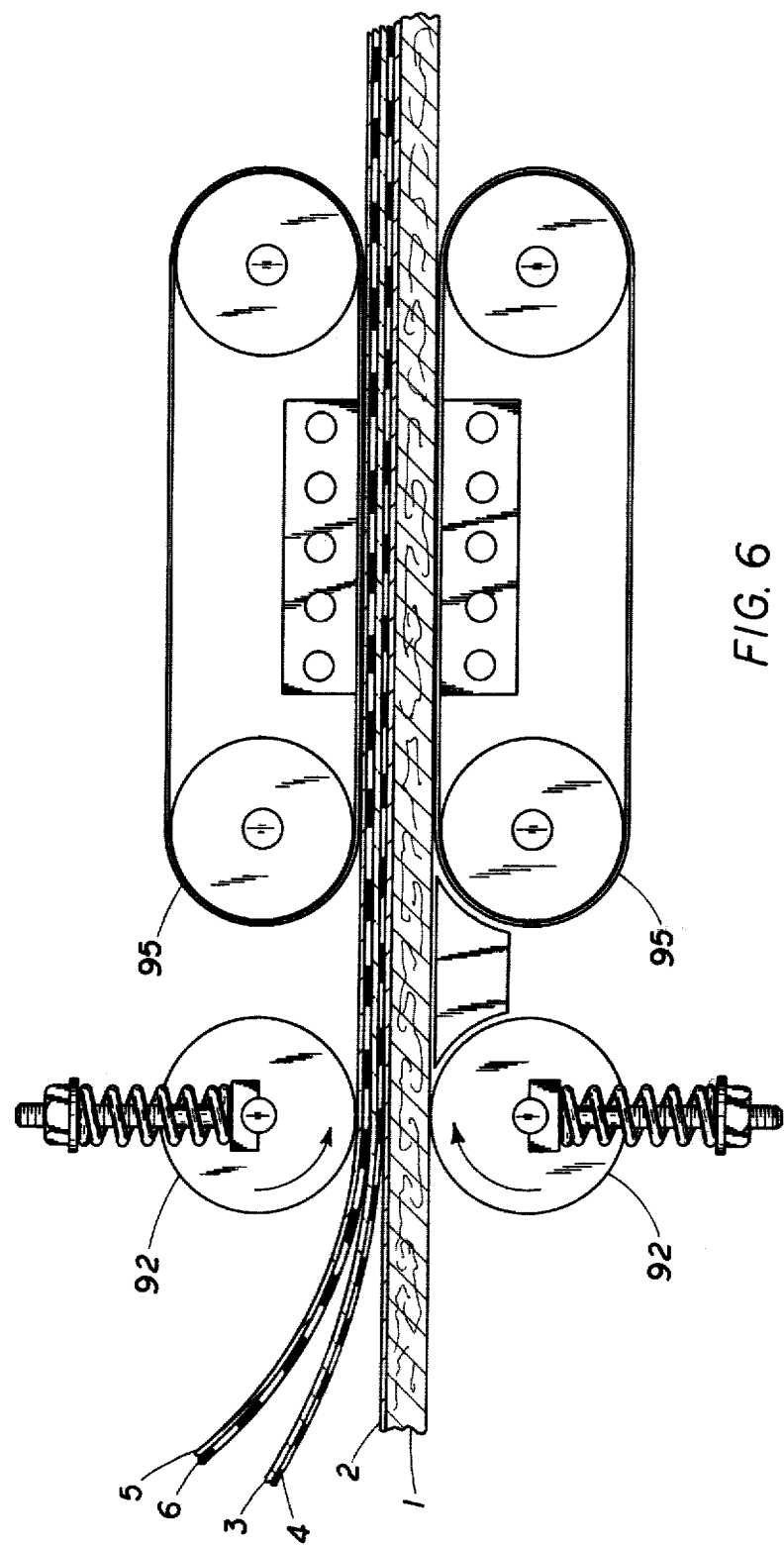
FIG. 6 is a view similar to FIG. 5 utilizing multiple overlay layers.

As has been so far described with the apparatus in FIG. 5 to produce a single corrective color laminate for FIG. 1a, the assemblage of FIG 1b is similarly accomplished by means of the same laminating apparatus shown in FIG. 5, except that multiple color-corrective films may be fed into the apparatus as shown in FIG. 6. The photographic remake print (1,2) to be color corrected is overlayed with composites of polymeric film 3 and 5, coated on one surface with a heat activated adhesive 4 and 6. As the photographic print assembly (1, 2, 3, 4, 5, and 6) proceeds through the laminating apparatus, bonding takes place between interfaces 2 to 4 and 3 to 6 to produce the finished color-corrected print, FIG. 1b. This process is usually applied to strips of multiple exposures to produce replicate copies for various merchandising as well as non-commercial photography or xerographic printing.

Figure 7:
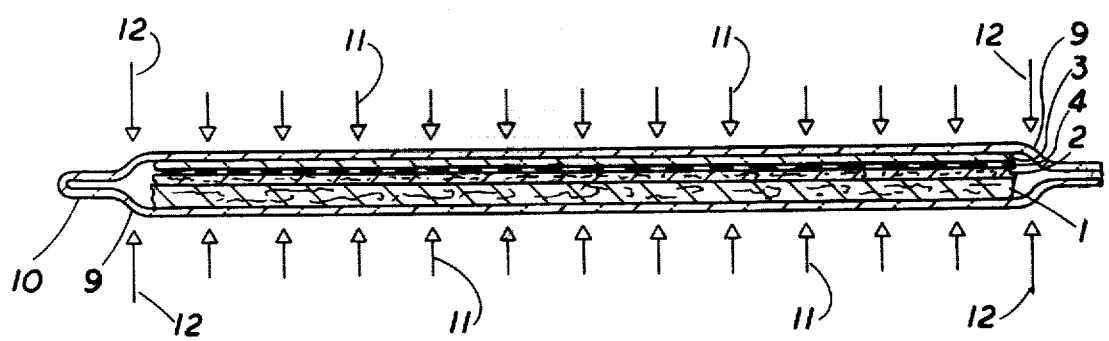
FIG. 7 is a cross-sectional view of a retaining frame holding the single overlay laminate of FIG. 1.

The assemblage of FIG. 1a is further accomplished, as indicated in FIG. 7, by placing the photographic print to be color-corrected (1,2) and a single layer of polymeric film 3 with an applied adhesive 4 component, within a plastic holding pouch 10 serving as a retaining frame. Such a pouch or frame may be of heat resistant plastic film 11, such as polytetrafluorethylene or polyimide of a thickness between 0.005 and 0.020, folded at point 12 and further indented at points provided by an appropriate frame 10. The indentation may be of appropriate dimensions to hold the photographic print and the overlay color-corrective polymeric film composite, placed into alignment while the photographic print and the polymeric film are being fed through the laminating apparatus of FIG. 5.

Figure 8:
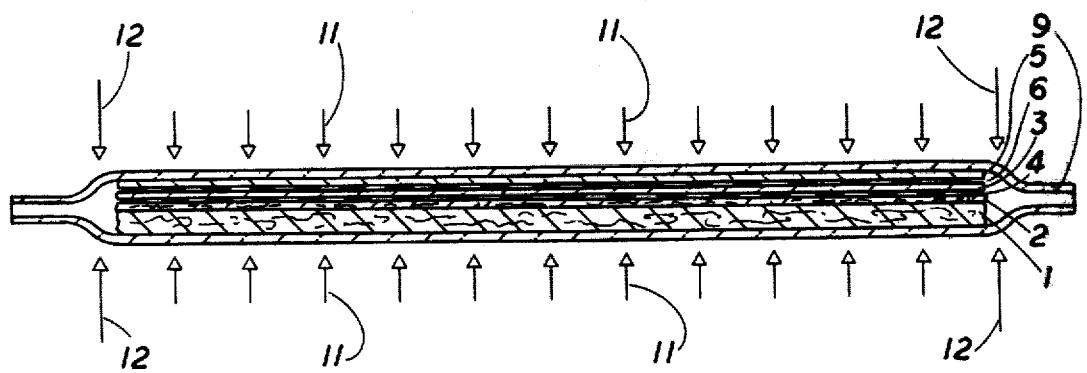
FIG. 8 is a view similar to FIG. 7 utilizing the multiple overlay laminate of FIG. 1.

Similarly, FIG. 8 shows the assemblage of FIG. 1b in holding pouch 10 wherein the holding pouch assists in the alignment of those components in FIG. 1b prior to and during the heat lamination process as accomplished by the apparatus in FIG. 5.

EXAMPLE V

A professional color photograph of an elderly male as a nearly full front portrait with facial dimension approximately one-fourth size was processed on a 14-inch by 17-inch print in the conventional manner but producing an markedly off-color with a pronounced green hue thereby rejected as an marketable product (Print A). A quick read-out on the digital color difference meter indicated, as shown in Table 4, an instrumental reading of minus "a" (−a) to the level of −5.5 units which indicated the need for the addition of a magenta laminate to absorb the green coupled with an added red laminate to reinforce the required redness for replicating the flesh tones. A second print (B) would be made according to the conventional process indicated in Section II, FIG. 2, involving the forming of a new negative using a green-cancelling proprietary magenta filter selected visually, and not instrumentally, with a supplementary red intensifying filter; in the conventional photographic process, the first greenish, or overly green Print (A) is discarded as a reject, thereby imposing an additional cost and delay in print finishing operations.

In lieu of making the second Print (B) a correction of the already processed Print A is undertaken employing a sequence of selected color overlays correlated to the above quick read-out as described sequentially in Table 4. A single magenta polyethylene terephthalate dyed overlay on Print A produces Print B whcih neutralizes the excessive green color (−a) but decreases markedly the yellow (+b) color. Next a red polyethylene terephthalate dyed overlay on Print A produces Print D with an acceptable flesh color tone with a yellow-over red ratio (+b/+a) somewhat higher (1.75) than that of the second processed Print B (1.13). Still another laminate correction using a combination of the magenta and the red polyethylene terephthalate laminates applied in Prints C and D, respectively, resulted in Print E which more nearly approximated the coloration of Print B.

TABLE 4

| | Laminate Color Correction Subject: Portrait - total facial feature (2-inch diameter digital scan) | | | | |
|---|---|---|---|---|---|
| | | Digital Color Difference Reading* | | | |
| Print | Reflectance L | (+) Red (−) Green a | + Yellow − Blue b | Yellow/Red Ratio** +b/−a | Remarks |
| (A) Reject | 35.6 | −5.5 | +11.3 | n/a | Excessively green |
| (B) Second Reprint | 32.7 | +7.1 | +8.0 | 1.13 | Acceptable |
| Laminate Color Correction on Reject (A) | | | | | |
| (C) Magenta 100 | 31.8 | +3.2 | +1.7 | 0.53 | Too red, inadequate |

TABLE 4-continued

| | Laminate Color Correction<br>Subject: Portrait - total facial feature<br>(2-inch diameter digital scan) | | | | |
|---|---|---|---|---|---|
| | | Digital Color Difference Reading* | | | |
| Print | Reflectance<br>L | (+) Red<br>(−) Green<br>a | + Yellow<br>− Blue<br>b | Yellow/Red<br>Ratio**<br>+b/−a | Remarks |
| (D) Red 300 | 30.2 | +5.6 | +9.8 | 1.75 | Acceptable |
| (E) Magenta 100<br>+<br>Red 300 | 29.8 | +6.5 | +8.8 | 1.35 | Acceptable |

*Hunter Digital Color Difference Meter D25D2A
**Calculated only when both yellow and red are indicated; (n/a) not applicable when green (−a) and blue (−b) are indicated.

For multiple copies in production to provide the acceptable Print E, the lamination is carried out according the arrangement depicted in FIG. 7 with the assembly of the integral components. Thus from the series indicated in Table 4, it is evident that an extended series of magenta, red, and other color overlays of graded intensities can be maintained on stock from which even finer or closer approximation to the desired portrait flesh tones expressed or correlated to the yellow-over-red (+b/+a) ratio within the range indicated in the tabulation can hardly be distinguished or differentiated visually. Only the precision and instrumental readings from a standard read-out system like that of the Hunterlab D25A2 can disclose the subtle difference between the values 1.13 and 1.75.

The descriptive details indicated in this example are similarly applicable to other photographs and prints as indicated by the examples (Example III and IV) given in application Ser. No. 887,436, filed May 10, 1978, now U.S. Pat. No. 4,178,096.

EXAMPLE VI

A xerographic color reproduction for a technical brochure required a long-lasting high fidelity color rendition on a light-weight paper on which the color xerox image is made, with the special qualifying specifications for protection against usual yellowing of the background paper, resistance to abrasion and scratches, and resistance to water spotting. Preliminary digital color difference measurements on the light weight paper stock before and after an accelerated test exposure (General Electric ultral-violet tubular lamp, 30-watt, 36-inch length at a distance of 24 inches for a period of 10 days), indicated marked yellowing visually and by the measured "b" yellowness/blue value in the digital color difference measurements, such as described in Tables 1, 2, and 3a and 3b, from an initial value of +0.6 to an exposed value of +3.8. In anticipation of this expected background color change that would affect the xerox color rendition and hence to maintain the initial color image for the brochure, the serially graded laminates such as listed in Table 3a are scanned for the best color correcting dyed laminate, which in this example indicated either the Blue STD (LATYL Violet BN, 10 seconds dye time) or the Blue ALT (LATYL 4R, 10 seconds dye time). With either one of these two color correcting polyester laminate films, having also incorporated therein an ultra-violet light stabilizer mentioned previously and made according to the dyeing process indicated in FIG. 4 and the adhesive application in FIG. 5, the selected laminate is then applied to the xerographic print in the multiple-copy production process, or singly as required, according to the laminating process indicated in FIG. 6, thereby providing the specified color-corrected and maintained, non-yellowing, abrasion and scratch resistant, and water-spot resistant finished color prints.

In the concept of this invention, there is presented a method involving several coordinated, integrated processes for producing color correcting laminates that compensate for any deficiency, exaggeration, or deterioration in the true principal colors of the natural, imaged object or objects along with a process for producing the high fidelity rendition in which the superimposed laminates become an integral part of the finished, durable reproduction. In this invention, the prints with their corrective overlays are mutually dependent upon the involvement of a reference or standard color comparator with existing objects, inanimate, scenic and animate living, whose spectral values are predetermined by a digital color difference system serving to monitor the print quality with measured digital color values which, in turn, direct the selection of dyed overlay laminates with quantitized corrective both additive and subtractive colors. These two digital color monitoring features, in turn, regulate the process factors that are made practical by laminating process whereby the deficient print, now provided with color correction, becomes an integral part of the finished print. The Examples described herein more than amply illustrates the overall concept and have indicated only a limited number of the principal component features, especially for the thin film used for the overlay, for the absorptive dyes for an extended range of color correction and for the adhesives used for which there are numerous modifications and equivalents that come within the scope of this invention.

As a primary structural component of this invention, the polyester chemical configuration has been used as representative example with special attributes for absorption of a variety of commercially available dyes to controlled spectral intensities quantitized by a digital color difference system. As mentioned previously, both, (a) the intralinear ester configuration in which the carbonyl —C(;O)O— linkage is made integrally into the polymer chain and (b) the extralinear ester configuration in which the —C(:O)O—, is made pendant or hanging on, so to speak, to the polymer chain, include the carbonyl configuration which has been found to be particularly effective in producing an extended range of selected color intensities. With dye-to-film absorption time intervals of 10 to 3000 seconds, the carbonyl configuration in these polymers allows incremental range of 6 or more grades of intensities within 1 to 2 percent deviation from reference DCD comparator standards, herein described. Typical examples of the intralinear polyesters are those derived from glycols and dicarboxylic organic acids, notable ones being ethylene glycol and terephthalic acid, respectively, from which polyethylene terephthalates are produced by condensation polymerization. Available commercially are numerous modification in which other glycols with polyhydric alcohol modifiers and analogs and homologs of terephthalate acid are used. Typical examples of extralinear polyesters are the cellulose esters in which the pendant acetyl and related homologs provide the external ester configurations, principal examples being cellulose acetates, propionates and the like. Commercial variations of cellulose esters provide a wide range of dye absorption rates for which incremental spectral color intensities can be controlled to permissible deviations from expected DCD reference comparator standards used in this invention. Other extralinear carbonyl configurations are obtainable from copolymers of acrylic esters with olefins, maleic anhydride with olefins and the like, to serve as dyeable, overlay film bases. The preference or choice for any of these chemical configurations is primarily based on physical and mechanical adaptability, such as initial films transparency in the one instance and the strength requirements for a tough durable overlay in the other. In addition, the balance of the mechanical properties, notable stiffness versus flexibility, is a criteria of the suitability of appropriate modifications and equivalents, especially for the dyeing operation depicted in FIG. 2 and for the mechanical application of the adhesives depicted in FIG. 3. In addition to stiffness versus flexibility characteristics, the tensile strength and tear sensitivity of the selected organic polymer structure is important. These features are usually adjusted by primary molecular forms, such as chain toxicity chain orientation and directional balance and degree of crystallinity and crystalline symmetry. These latter primary features determine the extent to which workable thickness range can be chosen for the overlays with the lowest possible thickness usually running generally 2 mils to 0.1 mil. Lastly, and not the least, is the topical feature of the uppermost overlay ranging in finish from glossy to matte and other textured forms of varying impressed surface modifications.

An integral part of this invention is the selection and application of the adhesives most suited to accomplish the effective and permanent bonding of the dyed polymeric film overlay to the photographic or appropriately imaged print and most suited for the finished artical as depicted in FIGS. 1a, 1b, and 1c and by the processing as depicted in FIGS. 4, 5, 6, 7 and 8, and the related Examples. Among the principal physical property requirements for the nature of the adhesives and their formulation for this invention is that they must be mobile with a range of viscosity compatible with the operating conditions indicated in the process of FIG. 4. Next, the chemical requirements include (a) hydrophobic or water-nonreactive nature to preclude any water absorption or hydration of any member of the finished multilaminar print, (b) inertness to the dyes selected for the principal colors used in color correction of the remake print, and (c) oxidative resistance that would preclude embrittlement and/or discoloration. These and other related and inferred requirements are adequately and most specifically met by the basic polymeric configuration having a strong inherent quality of tackiness commonly attributable to branched chain hydrocarbon gums and elastomers dericed from polyisobutylene either as an exclusive or as a partially recurring component of the polymeric chain or with structural organic analogs and homologs having one or more carbon structures similar in some segment of the molecular chain to that of the isobutylene polymerized segment. The parent structural component on which this requirement is based is that of the wide range of polyisobutylene grades ranging in weight average molecular weights from 1000 to 40,000 more or less. Numerous copolymers of the principal isobutylene monomer with other monomers such as that of ethylene, propylene, styrene, methyl and other alkyl acrylates, vinyl chloride, isoprene, chloroprene, and others can be used effectively for the laminate bonding. The principal criterion of the workable molecular weight in these copolymer compositions is that in a range of 10 to 300 poises at the application stage of the process depicted in FIG. 4. These and other analogs having the unique tertiary carbon like that of isobutylene with equivalent viscosity and inherent tackiness are considered to be within the operable features of this application and the quality of the finished, laminated color corrected prints. The polyisobutylene, as the principal adhesive component in the coating process formulation can be further modified by the inclusion of ultra-violet stabilizers, or ultra-violet screens, usually benzoquinone structures, to protect against actinic deterioration of the finished print.

What is claimed is:

1. The process of producing a high fidelity color reproduction of a color print of an imaged object comprising:
   (a) converting thin transparent polymeric laminating films by means of a dyeing process which is monitored by a digital color difference system to produce films of a graded series of intensities of different spectral colors,
   (b) selecting at least one particular laminating film of a certain color resulting from the dyeing process and
   (c) applying a bonding layer to the selected laminating film and laminating the layer and film to the color print to provide for a color adjustment to the color print which replicates the natural, inherent color of said imaged object.

2. The process of claim 1 wherein said polymeric laminating films are derived from organic polyesters.

3. The process of claim 1 wherein said polymeric laminating films are derived from polyethylene terephthalate.

4. The process of claim 1 wherein said polymeric laminating films have incorporated therein ultraviolet stabilizers.

5. The process of claim 1 wherein the dyeing of the thin transparent polymeric laminating film is continuously conveyed through immersion baths containing solutions of selected spectral dyes adjusted in concentrations and regulated in passage rates to provide graded, serial range of intensities of additive and subtractive colors to the traversed film.

6. The process of claim 1 wherein the dyeing of the thin transparent polymeric laminating film is continuously conveyed through a multiplicity of immersion baths of dyeing solutions and rinses to regulate the degree of attained color intensities monitored by digital color difference system.

7. The process of claim 1 wherein the dyeing of the thin transparent polymeric laminating film is continuously conveyed through a mutliplicity of immersion baths of dyeing solutions and stop rinses to regulate the degree of attained color intensities monitored by digital color difference system.

8. The process of claim 2 wherein the application of adhesive bonding layer to laminating dyed polyester film is continuously conveyed through immersion bath containing a solution of a thermoplastic adhesive formulated on one side heat sensitive or pressure sensitive adhesive singly or in combination thereof.

9. The process of claim 8 wherein the bonding layer to the laminating dyed polyester film is applied in a continuous manner through immersion bath containing a solution of adhesive compositions comprising polyisobutylene as the principal bonding ingredient.

10. The process of claim 9 wherein the immersion bath consists of a solution of adhesive composition comprising polyisobutylene as the principal bonding adhesive with an ultra-violet absorber.

11. The process of claim 3 wherein the lamination of the dyed film with its bonding side to the color print is carried out by simultaneously passing the dyed bonding film emplaced over the color print between the nip of a pair of rolls with adjustable pressuring and heating.

12. The process of claim 3 wherein the lamination of the dyed bonding film with its adhesive side emplaced on the color print is carried out by static application of heat and pressure.

13. The method of claim 2 wherein the thin transparent laminating film is derived from cellulose esters.

* * * * *